(12) United States Patent
Yencho

(10) Patent No.: US 8,529,770 B2
(45) Date of Patent: Sep. 10, 2013

(54) SELF-CONTAINED UV-C PURIFICATION SYSTEM

(75) Inventor: Stephen A. Yencho, Menlo Park, CA (US)

(73) Assignee: Water of Life, LLC., Menlo Park, CA (US)

( * ) Notice: Subject to any disclaimer, the term of this patent is extended or adjusted under 35 U.S.C. 154(b) by 683 days.

(21) Appl. No.: 12/576,156

(22) Filed: Oct. 8, 2009

(65) Prior Publication Data

US 2010/0025337 A1  Feb. 4, 2010

Related U.S. Application Data

(63) Continuation-in-part of application No. 11/862,631, filed on Sep. 27, 2007, now Pat. No. 7,862,728.

(51) Int. Cl.
*C02F 1/32* (2006.01)
*B01J 19/12* (2006.01)
*F03B 13/00* (2006.01)

(52) U.S. Cl.
USPC .............. 210/748.1; 210/748.11; 210/748.01; 210/748.13; 210/243; 210/143; 210/192; 210/241; 210/258; 422/20; 422/24; 422/186; 422/186.3; 422/28; 250/455.11; 250/504 R; 250/432 R; 250/436; 250/438

(58) Field of Classification Search
USPC ................ 210/748.1, 748.11, 748.01, 748.13, 210/600, 85, 87, 143, 192, 241, 258; 422/20, 422/24, 186, 186.3, 28; 250/455.11, 504 R, 250/432 R, 435, 436, 438
See application file for complete search history.

(56) References Cited

U.S. PATENT DOCUMENTS

| | | | |
|---|---|---|---|
| 1,196,481 | A | 8/1916 | Von Recklinghausen et al. |
| 1,200,940 | A | 10/1916 | Henri et al. |
| 1,307,500 | A | 6/1919 | Keyes et al. |
| 1,473,095 | A | 11/1923 | Henri et al. |
| 2,504,349 | A | 4/1950 | Prieto |
| 3,671,741 | A | 6/1972 | Woodbridge et al. |
| 3,836,781 | A | 9/1974 | Ellison |
| 3,903,000 | A | 9/1975 | Miura et al. |
| 3,924,139 | A | 12/1975 | Hirose et al. |
| 4,103,167 | A | 7/1978 | Ellner |
| 4,304,996 | A | 12/1981 | Blades |
| 4,336,223 | A | 6/1982 | Hillman |
| 4,372,860 | A | 2/1983 | Kaas |
| 4,400,270 | A | 8/1983 | Hillman |
| 4,471,225 | A | 9/1984 | Hillman |

(Continued)

FOREIGN PATENT DOCUMENTS

KR        836720 B1    6/2008

OTHER PUBLICATIONS

Ajay K. Ray & Antonie A.C.M. Beenackers, Novel Photocatalytic Reactor for Water Purification, Environmental and Energy Engineering, AIChE Journal, Feb. 1998, vol. 44,No. 2, p.
Elster AMCO Water, Inc. Evolution—Migratability, 2007 by Elster.

(Continued)

*Primary Examiner* — Joseph Drodge
*Assistant Examiner* — Cameron J Allen
(74) *Attorney, Agent, or Firm* — Haynes and Boone, LLP

(57) ABSTRACT

A portable UV-C purification system is provided that includes a current reduction technique for an electric pump to reduce power demands on an associated generator to thereby produce a light weight and efficient system.

11 Claims, 14 Drawing Sheets

(56) References Cited

U.S. PATENT DOCUMENTS

| | | | |
|---|---|---|---|
| 4,482,809 A | 11/1984 | Maarschalkerweerd | |
| 4,609,900 A | 9/1986 | Bachhofer et al. | |
| 4,629,896 A | 12/1986 | Bridgen | |
| 4,757,205 A | 7/1988 | Latel et al. | |
| 4,849,115 A | 7/1989 | Cole et al. | |
| 4,897,246 A | 1/1990 | Peterson | |
| 4,899,057 A | 2/1990 | Koji | |
| 4,909,931 A | 3/1990 | Bibi | |
| 4,952,376 A | 8/1990 | Peterson | |
| 4,968,489 A | 11/1990 | Peterson | |
| 5,030,125 A | 7/1991 | Toma et al. | |
| 5,037,618 A | 8/1991 | Hager | |
| 5,178,758 A | 1/1993 | Hwang | |
| 5,208,461 A | 5/1993 | Tipton | |
| 5,227,053 A | 7/1993 | Brym | |
| RE34,513 E | 1/1994 | Ellner | |
| 5,352,359 A | 10/1994 | Nagai et al. | |
| 5,366,705 A | 11/1994 | Reidy | |
| 5,393,419 A | 2/1995 | Tiede et al. | |
| 5,399,260 A * | 3/1995 | Eldredge et al. | 210/87 |
| 5,418,370 A | 5/1995 | Maarchalkerweerd | |
| 5,503,800 A | 4/1996 | Free | |
| 5,504,335 A | 4/1996 | Maarchalkerweerd | |
| 5,516,492 A | 5/1996 | Dong et al. | |
| 5,635,133 A | 6/1997 | Glazman | |
| 5,655,483 A | 8/1997 | Lewis et al. | |
| 5,660,719 A | 8/1997 | Kurtz et al. | |
| 5,683,589 A | 11/1997 | de Lasa et al. | |
| 5,707,594 A | 1/1998 | Austin | |
| 5,780,860 A | 7/1998 | Gadgil et al. | |
| 5,785,845 A | 7/1998 | Colaiano | |
| 5,790,934 A | 8/1998 | Say et al. | |
| 5,846,437 A | 12/1998 | Whitby et al. | |
| 5,952,663 A | 9/1999 | Blatchley, III et al. | |
| 6,015,229 A | 1/2000 | Cormack et al. | |
| 6,039,460 A | 3/2000 | Ng et al. | |
| 6,083,387 A | 7/2000 | LeBlanc et al. | |
| 6,099,799 A | 8/2000 | Anderson | |
| 6,126,841 A | 10/2000 | Whitby et al. | |
| 6,129,893 A | 10/2000 | Bolton et al. | |
| 6,144,175 A | 11/2000 | Parra | |
| 6,193,894 B1 | 2/2001 | Hollander | |
| 6,200,466 B1 | 3/2001 | Bender | |
| 6,224,759 B1 | 5/2001 | Whitby et al. | |
| 6,303,086 B1 | 10/2001 | Heimer | |
| 6,332,981 B1 | 12/2001 | Loyd | |
| 6,461,520 B1 | 10/2002 | Engelhard et al. | |
| 6,500,346 B1 | 12/2002 | Taghipour et al. | |
| 6,533,930 B1 | 3/2003 | Kool et al. | |
| 6,565,803 B1 | 5/2003 | Bolton et al. | |
| 6,614,039 B2 | 9/2003 | Hollander | |
| 6,773,584 B2 | 8/2004 | Saccomanno | |
| 6,773,608 B2 | 8/2004 | Hallett et al. | |
| 6,784,440 B2 | 8/2004 | Fink et al. | |
| 6,803,587 B2 | 10/2004 | Gadgil et al. | |
| 6,875,988 B1 | 4/2005 | Sauska et al. | |
| 6,932,903 B2 | 8/2005 | Chang | |
| 6,972,415 B2 | 12/2005 | Schaible et al. | |
| 6,974,958 B2 | 12/2005 | Gadgil et al. | |
| 6,976,508 B2 | 12/2005 | Ueberall | |
| 7,018,544 B2 | 3/2006 | Veenstra et al. | |
| 7,031,849 B2 | 4/2006 | Lawryshyn et al. | |
| 7,077,965 B2 | 7/2006 | Williamson et al. | |
| 7,081,225 B1 | 7/2006 | Hollander | |
| 7,217,933 B2 | 5/2007 | Gadgil et al. | |
| 7,304,312 B2 | 12/2007 | Hopaluk et al. | |
| 7,422,680 B2 | 9/2008 | Sheets | |
| 2005/0082235 A1* | 4/2005 | Bernstein et al. | 210/748 |
| 2005/0109705 A1* | 5/2005 | Webb | 210/743 |
| 2005/0279679 A1* | 12/2005 | Baarman | 210/143 |
| 2007/0096681 A1* | 5/2007 | Bilac et al. | 318/729 |
| 2009/0032446 A1* | 2/2009 | Wiemers et al. | 210/85 |

OTHER PUBLICATIONS

US EPA, Guide Standard and Protocol for Testing Microbiological Water Purifiers, Report of Task Force, Submitted Apr. 1996.
Aquafine Corporation SL Series Installation, Maintenance, and Operation Manual Part No. 108-1, Revised Oct. 2003.
Cryptosporidium Inactivation by Low-Pressure UV in a Water Disinfection Device, A.C. Drescher, D.M. Greene and A.J. Gadgil, Journal of Environmental Health, Oct. 2001.
UV Waterworks 2.0: Answers to Ten Commonly Asked Questions about the Design, operation, and economics. Ashok Gadgil, Indoor Environment program Energy&Environment Division . . . , Nov. 1995, Lawrence Berkeley National Laboratory.

* cited by examiner

SELF-CONTAINED UV-C PURIFICATION SYSTEM

RELATED APPLICATION

This application is a continuation-in-part of U.S. application Ser. No. 11/862,631, filed Sep. 27, 2007.

TECHNICAL FIELD

This application relates to the purification of fluids and more particularly to the purification of fluids by a self-contained UV-C purification system configured for lower power consumption and greater efficiency.

BACKGROUND

Various systems exist that purify water using ultraviolet light. In that regard, ultraviolet (UV) light is classified by its wavelength into UV-A, UV-B, and UV-C groups. The first two groups are the relatively-longer wavelength tanning rays emitted by the sun. UV-C (which is also denoted as UVC), however, is a relatively-shorter UV wavelength blocked by atmospheric oxygen and nitrogen to the benefit of life on earth because of its lethal effects. It is these lethal effects that are exploited in UV-C water purification systems to provide potable drinking water.

Potable drinking water is one of the most essential needs for sustaining human life in an emergency or a natural disaster. Portability and light weight are important characteristics for emergency drinking water purification systems, especially for systems which are to meet distributed populations during an emergency. Moreover, portability and light weight are desirable in such systems for serving rural or remote locations. However, conventional UV-C water purification systems are typically inadequate for mobile applications. This inadequacy arises from the need to achieve elimination of substantially all pathogens to achieve potability. For example, even a relatively small volume of water such as an eight ounce drinking glass may contain millions or even billions of pathogens. A 99.9% kill efficiency bacteria or virus inactivation efficiency in a UV-C water purification system could thus pass scores of viable pathogens into the treated water. For pathogens such as cholera bacteria, the results could well be lethal for consumers of the treated water. Thus, governmental agencies such as the United States (US) EPA promulgate very stringent goals for testing pathogen removal—for example, the US EPA requires a removal rate of 99.9999% (6 logs) for bacteria in public drinking water. To attempt to meet such stringent demands, conventional UVC purification systems must ensure that the water being passed through the system receives a sufficient exposure time to the UV-C light. But such systems must also support an adequate flow rate to produce sufficient quantities of water. For example, a typical per capita water consumption is 2 gallons per day such that a system servicing just 1000 people would have to treat at least at least 2000 gallons daily. Thus, conventional UVC water purification systems that meet the stringent US EPA standards are quite heavy so as to provide the necessary flow rate yet also have an adequate dwell time within the system for pathogen elimination. In addition, such conventional UVC water purification systems have substantial power demands and associated costs.

To meet the need for a self-contained purification system that is portable, light weight, and power-efficient, U.S. application Ser. No. 11/862,631 (the '631 application) discloses a UVC water purification system that includes a chamber having baffles defining a plurality of sub-chambers. The baffles are arranged such that each sub-chamber defines a sub-volume or portion of the volume contained by the chamber. For example, in one embodiment, the chamber is an elongated tube subdivided by separate baffles into corresponding sub-chambers. In this fashion, water being purified passes consecutively from sub-chamber to sub-chamber through passageways or conduits defined by the intervening baffles. A UV-C light source illuminates each sub-chamber to eliminate pathogens. The use of baffles to define sub-chambers in this fashion introduces a dramatic increase in the pathogen removal rate as compared to conventional (un-baffled) UV-C water purification systems. For example, if two systems of identical chamber volume, flow rate, and UV-C source power are provided except that one is baffled into sub-chambers as discussed in the '631 application, the baffled system will have a pathogen removal rate that is orders of magnitude greater—for example, a log reduction of 6 in pathogens for the baffled system as compared to a log reduction of below 3 for the un-baffled system.

This dramatic increase in efficiency leads to substantial weight reduction because the un-baffled system in the comparison just discussed would have to be increased in size so that the dwell time within the system is sufficient to produce the desired pathogen removal rate. Alternatively, the un-baffled system would require a substantially greater power UV-C source, which then demands a much heavier generator to provide the necessary power draw by such a larger source. Thus, a relatively small (and thus light weight) baffled system as disclosed in the '631 application can provide the same flow rate of a much heavier conventional UV-C water purification system, yet provide a substantially higher pathogen removal rate.

Regardless of whether baffles are provided or not, the use of an electric pump driven by a generator is typically required by a UV-C water purification system to provide a flow rate sufficient to provide an adequate quantity of treated water in locations in which water utilities providing a sufficient water pressure are unavailable. The weight of the pump and associated generator can be substantial. Accordingly, there is a need in the art for improved UVC water purification systems with light weight pump and generator architectures.

SUMMARY

An electric-motor-driven pump for pumping fluid from a non-treated fluid source through a UV-C purification system to produce treated fluid will draw larger currents upon motor startup as compared to that current used by the motor during subsequent normal operation. In a portable UV-C system, a generator provides the current to the motor. This generator must be robust enough to thus supply the additional current necessary upon pump motor startup even though subsequent normal operation will require less current-production capacity (and hence achievable power output) by the generator To provide a lighter and more efficient UV-C system, a current reduction control module is provided that reduces electric pump peak current demands at motor startup. In this fashion, a significant reduction is achieved in the size and weight of an associated generator powering the pump motor as compared to conventional UV-C systems. Alternatively, a capacitor-start of split-phase motor may be used to reduce motor startup current demands.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

DESCRIPTION OF THE FIGURES

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
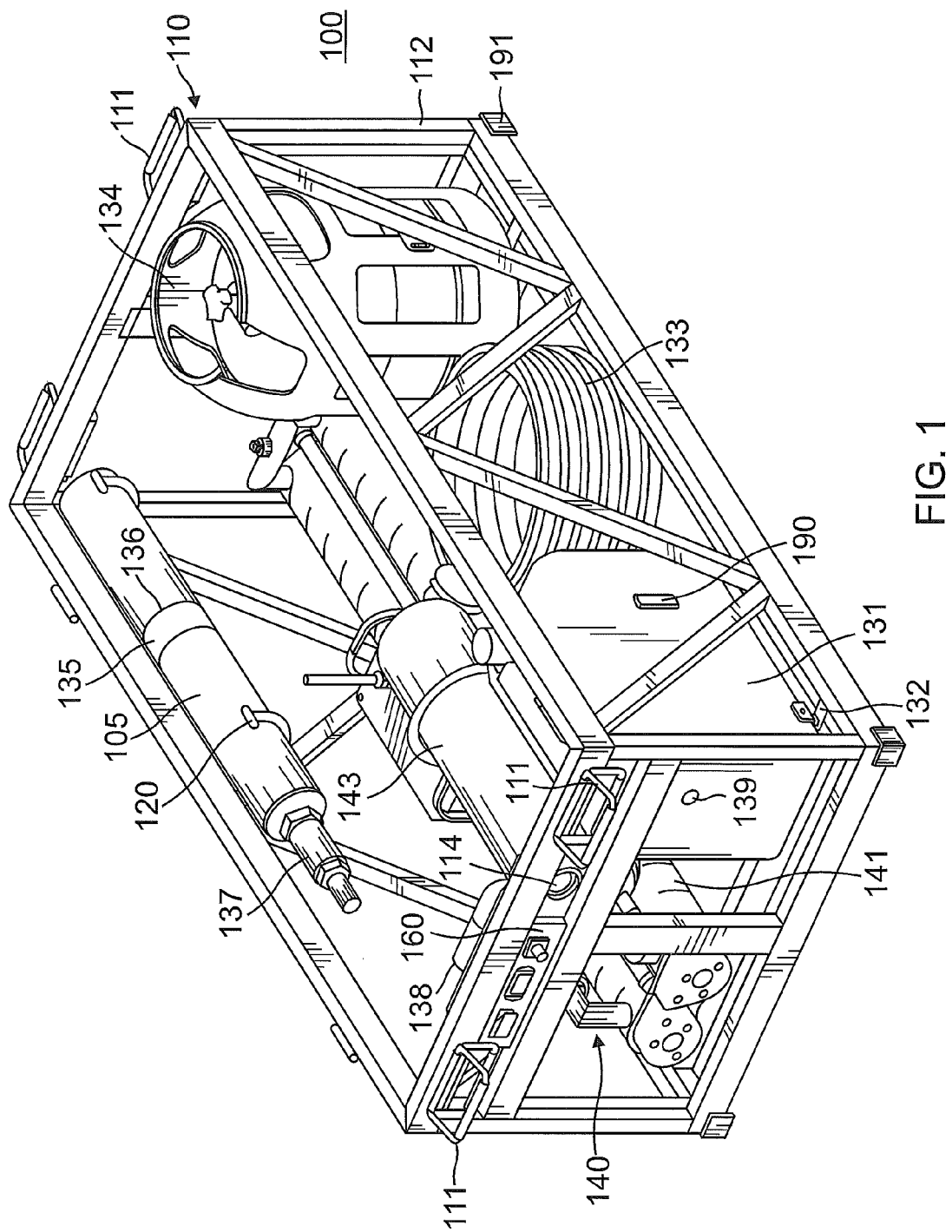
FIG. 1 is a cut-away perspective view of a UV-C water purification system in accordance with an embodiment of the invention.

Turning now to the drawings, a portable UV-C purification system 100 is shown in FIG. 1 to address the need in the art for lighter and more efficient UV-C purification systems. As will be explained further herein, system 100 includes a housing 110 for containing an electric-motor-driven pump 115, a power source such as an internal-combustion-engine-driven generator 131 for supplying the current necessary to power pump 115, a fuel source such as a propane tank 134 and associated pressure regulator(s) (not illustrated) for the generator's engine, and a UV-C purification unit 140 for receiving and purifying fluid pumped from a fluid source by pump 115. It will be appreciated that system 100 may be modified as desired for certain applications such that it includes only a subset of these components. For example, one alternative embodiment for system 100 would include just a generator and the UV-C purification unit. Another alternative embodiment would comprise a UV-C purification unit, a controllable output valve, batteries, and a battery charger. Thus, alternative embodiments may be constructed from the set of fundamental elements shown in FIG. 1: in other words, a portable UV-C purification system in accordance with the present disclosure may include a housing, a power source, a fuel source, a pump, and a UV-C purification unit. However, a portable UV-C purification system in accordance with the present disclosure may be constructed using various subsets of these fundamental elements. These elements will now be discussed in further detail, beginning with housing 110 and pump 115.

The Housing and the Pump

Housing 110 (which may also be denoted as a frame) is shown in a cut-away view in FIG. 1 so as to display the remaining system elements contained within housing 110. Additional features for the housing will be discussed with regard to FIGS. 2 and 3. Referring again to FIG. 1, pump 115 is mounted within the housing though one or more mounts 120. Because a submersible pump has the advantageous property of being self-priming, the following discussion will assume that system 100 includes a submersible pump although it will be appreciated that system 100 may be implemented using non-submersible electric-motor-driven pumps. Thus, system 100 may be generically defined to include some type of electrically-driven pump such as submersible pump 115. Alternatively, a hydraulically-powered pump or other power source for the pump may be utilized. As known in the submersible pump arts, submersible pump 115 includes a hermetically-sealed cavity to store the associated electric pump motor (the cavity and associated electric motor for submersible pump 115 in FIG. 1 are not shown for illustration clarity). Alternatively, pump 115 may be a flooded type pump that employs a water presence sensor as further described herein to ensure that the pump is submerged during operation. Pump 115 may include a backflow prevention valve 137 to prevent water from draining out of system 100 if the pump is stopped or stalled. Alternatively, a backflow prevention means may be located on the system outlet.

The remaining discussion for system 100 will be directed to an embodiment for treating drinking water but it will be appreciated that system 100 is readily adapted for the elimination of pathogens in other types of fluids. With regard to a water source for system 100 pump 115 is preferably submerged in this water source (not illustrated), assuming that pump 115 is a submersible pump. To allow removal of the pump for submersion into the water source, mounts 120 are configured such that pump 115 is removably mounted within housing 110. In this fashion, users may transport housing 110 to a suitable location and then remove the pump 115 so that it may be submerged in the water source. Housing 110 may includes a coil or conduit 133 of flexible tubing to fluidly couple pump 115 to an input port 114 for UV-C purification unit 140 (unit 140 is discussed further below with regard to FIG. 4). By providing a sufficient length for coil 133 in housing 110, a user may thus lower pump 115 down a ground well or reach other water sources that may be relatively remote from housing 110. Conduit 133 may include quick-release fittings to conveniently couple to corresponding fittings on pump 115 and intake port 114 for ease of use. An output port 138 for UV-C purification unit 140 may also include a quick-release fitting so that a user may readily couple system 100 to a vessel or container for holding the treated water as processed through UV-C purification unit 140.

Submersible pump 115 may be used to pump water from any suitable water source such as rives, lakes streams, standing ground water, or even water from swimming pools. Pump 115 is preferably submerged sufficiently deep enough in the water source such that a pump intake 135 for pump 115 is suitably displaced from a water line surface for the source so as to reduce any uptake into system 100 of low density contaminants such as fuel or organic compounds. To prevent vapor lock, pump 115 may be a multi-stage pump having vents or openings in one or more of the initial stages. A strainer 136 such as a stainless steel mesh filter covers intake 135 to further reduce uptake into system 100 of contaminants or particulate matter. Alternatively, strainer 136 may be constructed from a nylon or polypropylene mesh, woven metal, or other suitable materials. In addition, uptake of particulates into system 100 may be even further reduced through incorporation of filters (not illustrated) such as particulate filters, inorganic filters, organic filters, activated carbon filters, chemical filters, and nuclear isotope filters. Such filters may be incorporated in the fluid path within pump 115, in conduit 133, or at an intake or output port for UV-C purification unit 140. For example, a dual-gradient filter 143 may be interposed between intake port 114 and a first chamber 141 for UV-C purification unit 140. In addition, some embodiments of system 100 may include a reverse osmosis purifier or ozone-based purifier (not illustrated) at a suitable location within the fluid path in system 100 to further clarify the treated water produced by system 100.

Figure 14:
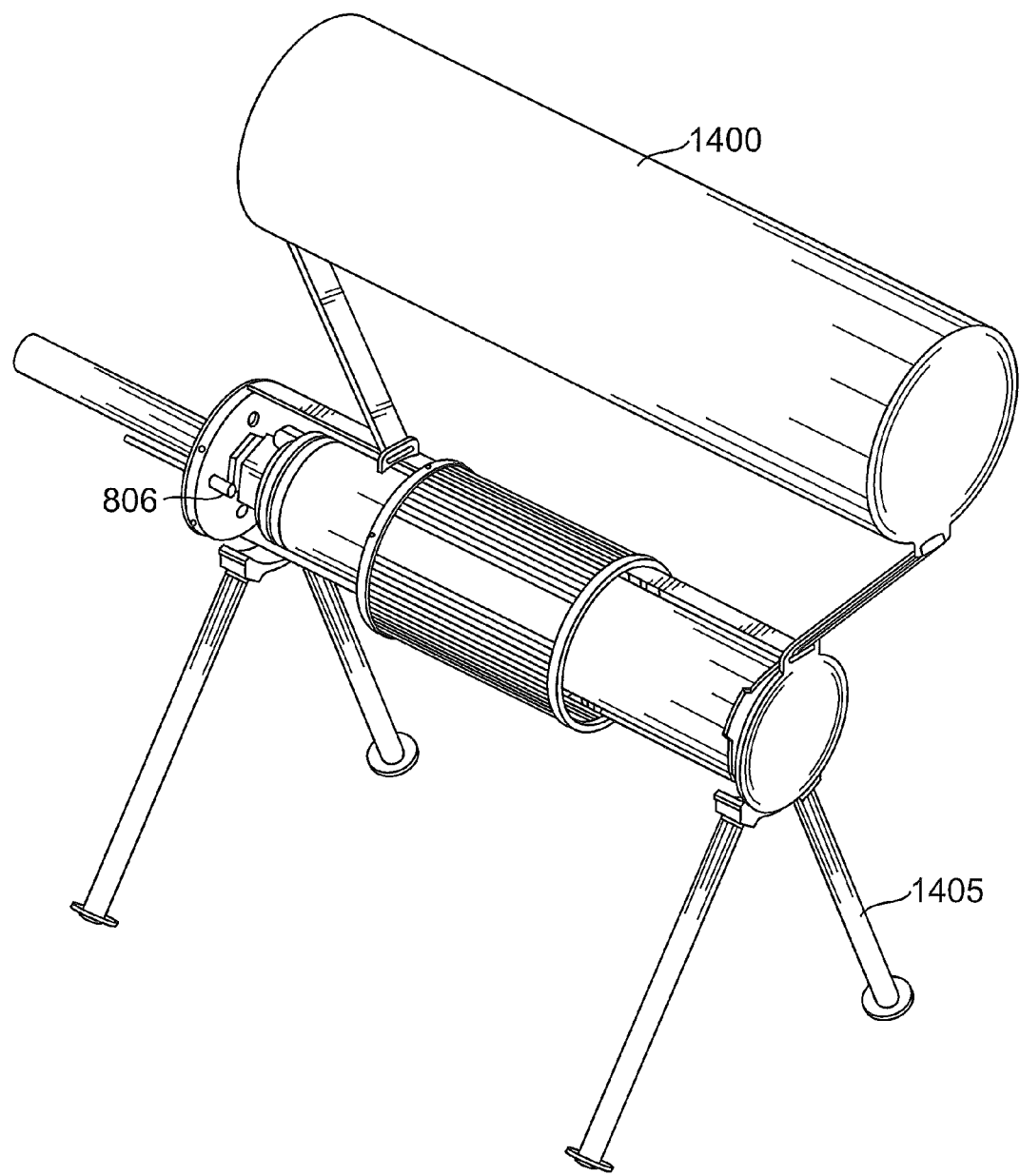
FIG. 14 is a cut-away perspective view of an electric-powered pump and its associated elements.

As seen in FIG. 14, pump 115 may be configured with a float 1400 to suspend the pump a suitable distance below the water line surface. Alternatively, pump 115 may be configured with legs 1405 to support the pump above the bottom of a water source. In this fashion, the ingestion of mud or other contaminants from the reservoir bottom surface is avoided. A water sensor such as an ultrasonic water sensor 806 operates to prevent pump 115 from operation without appropriate submersion in the water supply.

Figure 2:
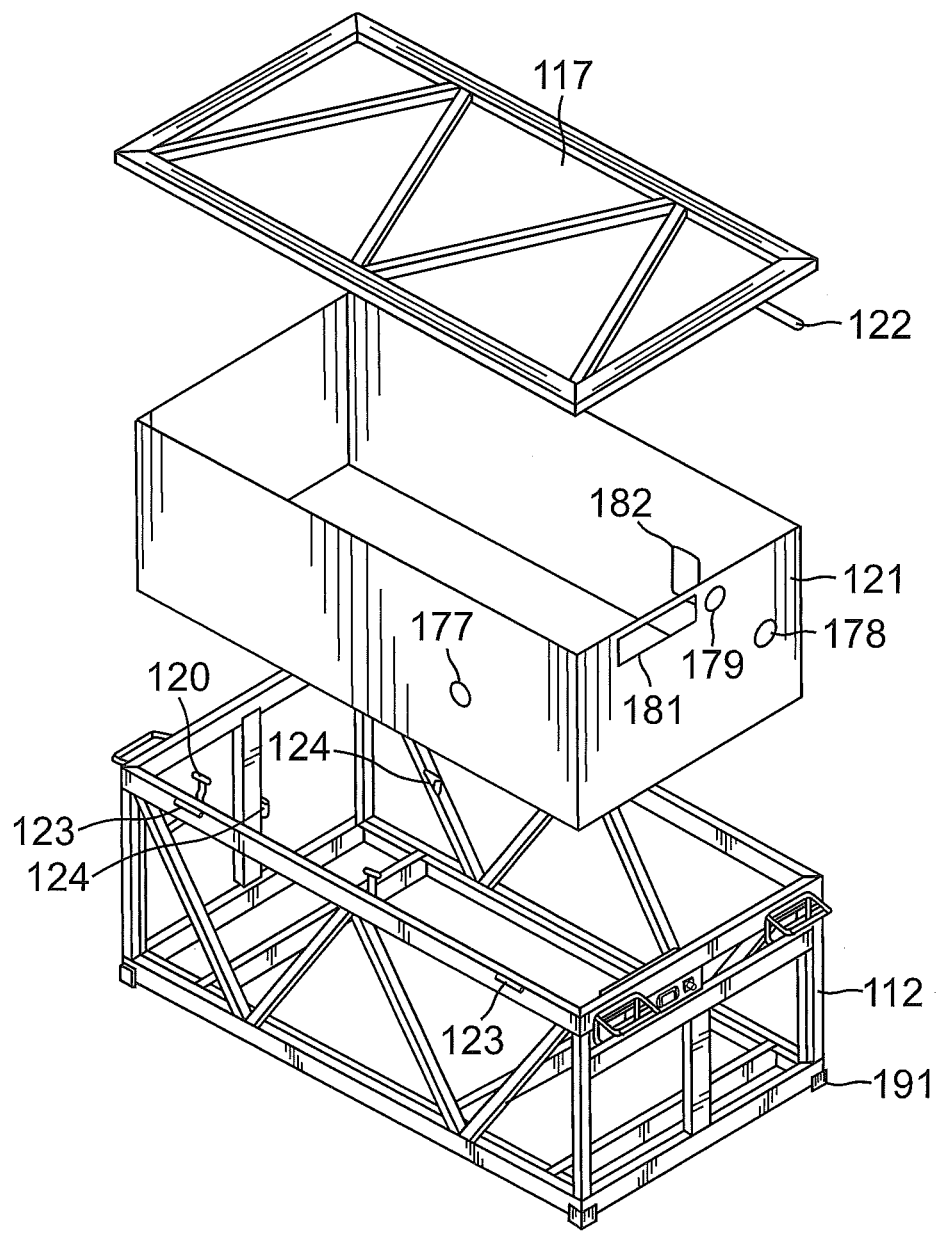
FIG. 2 is an exploded view of the housing for the system of FIG. 1 and an associated housing liner.
Figure 3:
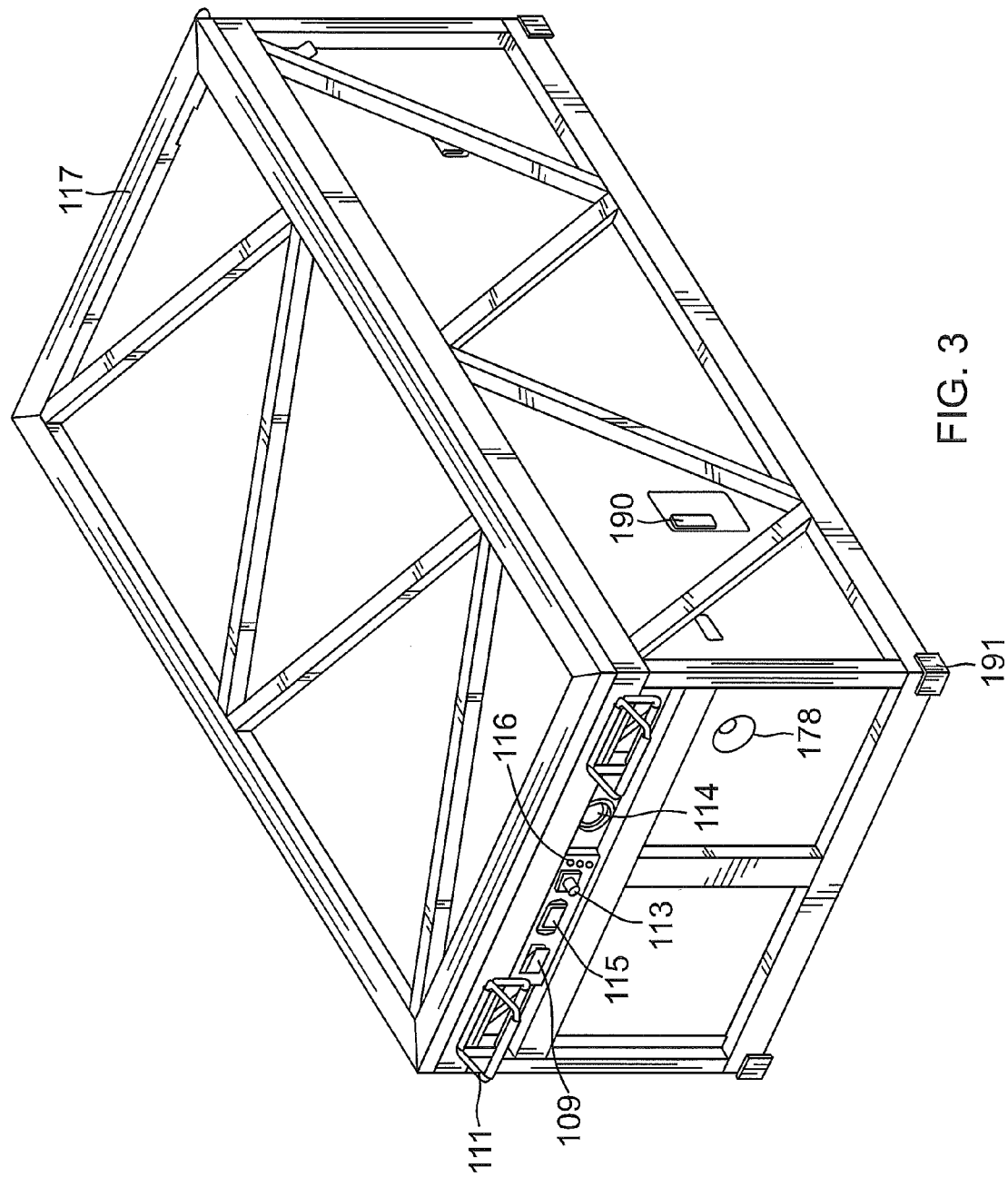
FIG. 3 is a perspective view of the housing of FIG. 1.

Additional features for housing 110 may be better understood with reference to FIGS. 2 through 3. In one embodiment, housing 110 may have overall dimensions of about 130 centimeter (cm) long by 70 cm wide by 50 cm tall. To allow convenient access to system components, housing 110 may include a cover 117 pivotably mounted to a base frame 112 through hinges 123 as seen in FIG. 2. In this fashion, cover 117 may be closed to protect the system components carried within base frame 112 during storage and transport of system 100 but then opened to allow access to these components for UV-C operation and maintenance. To keep cover 117 open during access periods, gas springs 122 or other suitable means such as a prop or mechanical springs may be provided. For convenient positioning of system 100 prior to use, such as through hand carrying system 100 from a vehicle or cart to a suitable ground location adjacent the water source, housing 110 may include several handles 111. Housing 110 may be reinforced by corner guards 191. To protect internal components from water damage, housing 110 may be lined by a water-proof or water-resistant lining 121 using a suitable material such as PVC. To accommodate inlet port 114 and outlet port 138 for UV-C purification unit 140, liner 121 includes ports 179 and 177, respectively.

In addition, housing 110 may also define a waterproof electronics sub-container section 160 for protecting electronic circuitry for controlling and monitoring system 100. A convenient location for electronics section 160 is on base frame 112 as shown in FIGS. 1 and 3 as accommodated through a suitable port 181 in liner 121. Electronics sub-container section 160 may support an external on-off switch 109, display devices such as an hour meter 115 that indicates the total usage time for system 100, and miscellaneous status indicator lights 116. Electronics sub-container 160 may support a liquid crystal display, a touchscreen computer with vacuum fluorescent display, or other display means for conveying control and status information for system 100 to a user. In this fashion, system 100 could both display its current status and state as well as display instructions for required actions by the user. In addition, section 160 may support an external electric coupler or fitting 113 for providing power to pump 115 from a power source such as generator 131. Conduit 133 may be integrated with a power cord for carrying current produced by generator 131 through a coupling to fitting 113 and a similar fitting on pump 115 (not illustrated). Alternatively, a separate power cord may be coiled with conduit 133 within base frame 112. The electrical fittings or couplers may be water-insulated type to allow safe coupling even if the fittings are wet or submerged as known in the electrical power coupling arts. Having thus discussed the housing and the pump in greater detail, a detailed discussion for generator 131 is as follows.

The Generator and its Fuel Source

To provide electrical power to pump 115, system 100 includes a power source such as generator 131 or a battery. Generator 131 includes an internal combustion motor for generating mechanical power for conversion into electricity. Generator 131 may be mounted to housing 110 using vibration-isolating mounts 132. An exhaust 139 vents combustion exhausts from the generator's motor through a port 178 in liner 121. An optional muffler or spark arrestor may be added to the generator as required. For simplicity of construction and to eliminate any battery needs for electric starting of the generator motor (and thus prolong maintenance-free storage times), generator 131 is preferably configured for hand-starting through a pull cord 190, though other starting systems such as a spring-wound starter or an electric starter can be employed. A port 182 in liner 121 accommodates pull cord 190.

Although the generator motor may be started using pull cord 190, it will require a fuel source regardless of how this motor is started. To provide fuel to the internal-combustion motor for generator 131, a propane source such as fuel cylinder 134 is advantageous because propane may be safely stored for years in preparation for a disaster or other emergency without degradation of fuel quality or loss of fuel through evaporation. Since propane is stored in a closed container, it does not produce explosive fumes, making it safer to store than gasoline or diesel fuel. To lower the overall weight for system 100, cylinder 134 may be constructed from a fiberglass composite although conventional metallic (for example, aluminum or steel) propane cylinders are also suitable. Cylinder 134 may include an inspection window (not illustrated) to permit direct inspection by a user of the level of fuel remaining. Alternatively, propane cylinder 134 may be configured with an ultrasonic sensor to monitor fuel capacity within the cylinder. In another embodiment, a strain-gauge sensor may be placed below the cylinder to monitor the fuel capacity. The resulting fuel capacity from such sensors may then be directly displayed to the operator or wirelessly transmitted to a remote user. Housing 110 may thus include an observation port (not illustrated) for visual observation of the propane fuel level. Fuel cylinder 134 may be secured to housing through straps or webbings attached to frame mounts 124. Although propane has advantageous properties as discussed above, it will be appreciated that generator 131 may be powered by an other fuels such as natural gas, diesel, butane, ethanol, methanol, gasoline, diesel, or other fuels. Indeed, system 100 may be switched from an initially-intended fuel such as propane to an alternative fuel such as gasoline if disaster conditions limit a particular fuel's availability. In one embodiment, propane tank 134 provides enough fuel to run generator 131 for 45 hours. In that regard, the length of operation for a given tank of fuel is increased by the current reduction techniques discussed further herein because the necessary generator output is reduced, which thus enables the use of lighter, less-powerful-but-more-efficient generators.

Although the following discussion will assume that the power source for pump 115 is an internal-combustion-engine-driven generator, it will be appreciated that alternative embodiments of system 100 may be powered by a fuel cell such as a solid-oxide fuel cell, or batteries such as lithium-ion batteries, nickel-metal hydride batteries, deep-cycle batteries, or other battery types. The advantage of such alternatives to motor-driven generators is that they do not emit noise or exhaust fumes enabling the system to be used in applications where noise cannot be tolerated. Moreover, batteries do not emit exhaust and thus can be used in situations where exhaust is intolerable. A battery-driven application enables extended periods of operation with intermittent recharging.

In one embodiment, operation of system 100 commences once the system is placed in a suitable level location near the water source. At this point, the user may open cover 117 and electrically couple pump 115 to power outlet 113 as well as fluidly couple pump 115 to inlet 114 as discussed previously. The pump may then be submerged in the water source, ideally at least 150 mm below the water surface and suspended by float 1400 and/or supported by legs 1405 as discussed with regard to FIG. 14 so as not to ingest foreign matter such as mud from a bottom surface for the water source. A valve is opened on fuel cylinder 134 to allow fuel to flow to generator 131. A generator switch (not illustrated) is turned to the on position. If needed, a generator choke is adjusted, and cord 190 pulled to start the generator. Once the generator has been allowed several minutes to warm up, any choke used is turned off.

With the generator producing power and the pump coupled as discussed above, main power switch 109 on electronics sub-container 160 is switched to the on position. Generator 131 is thus enabled to begin supplying power to pump 115 and to a UV-C source within UV-C purification unit 140. It will be appreciated that any conventional UV-C purification unit may be utilized in system 100 in that the current reduction features discussed herein may be enjoyed regardless of the type of UV-C purification unit used for a particular embodiment. However, as discussed above, the '631 application discloses a particularly advantageous UV-C purification unit configured with sub-chambers so as to enhance the pathogen inactivation power for any given UV-C source. In other words, if a conventional UV-C purification unit and the UV-C purification unit as disclosed by the '631 application are provided with the same flow rate and the same UV-C source, the '631 UV-C purification unit will advantageously produce a significantly greater pathogen inactivation rate. Thus, the following discussion will assume without loss of generality that UV-C purification unit 140 includes sub-chambers as discussed in the '631 application.

The UV-C Purification Unit

Figure 4:
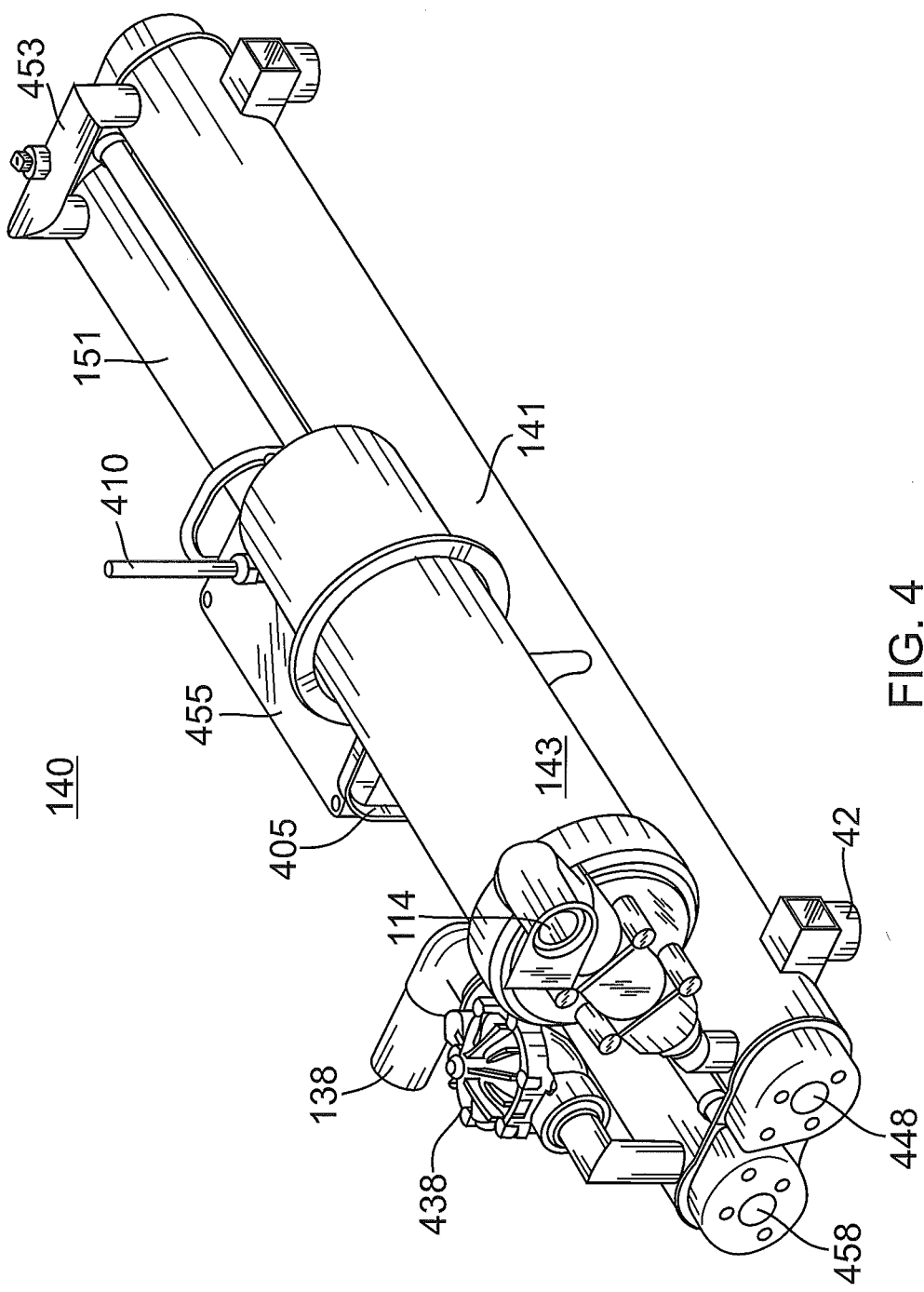
FIG. 4 is a perspective view of a UV-C water purification unit for the system of FIG. 1.

Operation of unit 140 may be better understood with reference to FIG. 4. Water pumped from pump 115 enters UV-C purification unit 140 at inlet 114 to flow through filter 143 for removal of particulates, organics, or other contaminants. The filtered water may then flow through a chamber such as formed through one or more purification tubes. In UV-C purification unit 140, there are two purification tubes: a first purification tube 141, and a second purification tube 151. These tubes may be preferentially constructed of 304, 304L, 316, 316L or other stainless steel or anodized aluminum or other suitable materials. For example, the purification tubes may be fabricated of a co-extruded polymer food grade plastic such as PVC, polyethylene, or polypropylene, high density polyethylene, or low density polyethylene with a co-extruded inner lining of a UVC resistant polymer such as polyimide, polytetraflouroethylene (PTFE), fluorinated ethylene propylene (FEP), polyvinylidene fluoride (PVDF), polyetheretherketone (PEEK), or polyetherimide (PEI). Alternately, the purification tubes may be constructed of PVC or polycarbonate or acrylic or other non-UVC resistant polymer material if carbon black or other UV inhibitor is added to the polymer to prevent UVC damage. Each of these tubes defines its own chamber that is sub-divided into sub-chambers by corresponding baffles as will be explained further with regard to FIG. 5. The baffles may be constructed from the metals or plastics discussed above for the purification tubes or from other suitable materials. Filtered water from filter 143 flows into first purification tube 141 and then through a cross-over tube 453 into second purification tube 151. After passing through tube 151, the treated water proceeds through a cut-off valve 438 and finally to outlet 138. Tube 141 includes a UV-C lamp 448 whereas tube 151 includes a UV-C lamp 458 (as indicated through their lamp caps). These lamps extends through all the sub-chambers within their tubes so that each sub-chamber may receive a sufficient amount of UV-C irradiation. As illustrated in FIG. 4, each lamp may be centrally mounted with regard to its tube although off-center mounts may also be used. The lamps may be single-ended or double-ended lamps as known in the arts. Regardless of whether a lamp is double or single ended, either or both lamp ends may extend beyond the sub-chambers outside of any water contact as discussed in the '641 application. A UV-C photodetector (not illustrated) may be placed at this lamp end outside of the water (for example, the adjacent sub-chamber may be sealed off through an o-ring) so that photodetector is not subject to fouling. Because lamp light will still be produced at this outside-the-subchamber lamp end, the photodetector can monitor lamp performance without exposure to the treated water. It will be appreciated, however, that a photodetector location within the sub-chambers may also be utilized.

A waterproof electronics enclosure 455 protects the driving electronics for the lamps such as a ballast. As known in the fluorescent lamp arts, such lamps exhibit an inversely-sloped impedance behavior that would otherwise strain generator 131 performance without the counteracting effects of a suitable ballast. Enclosure 455 may be protected by one or more hoops 405. An electrical coupling 410 from generator 131 to enclosure 455 is shown partially cut-away for illustration clarity.

Figure 5:
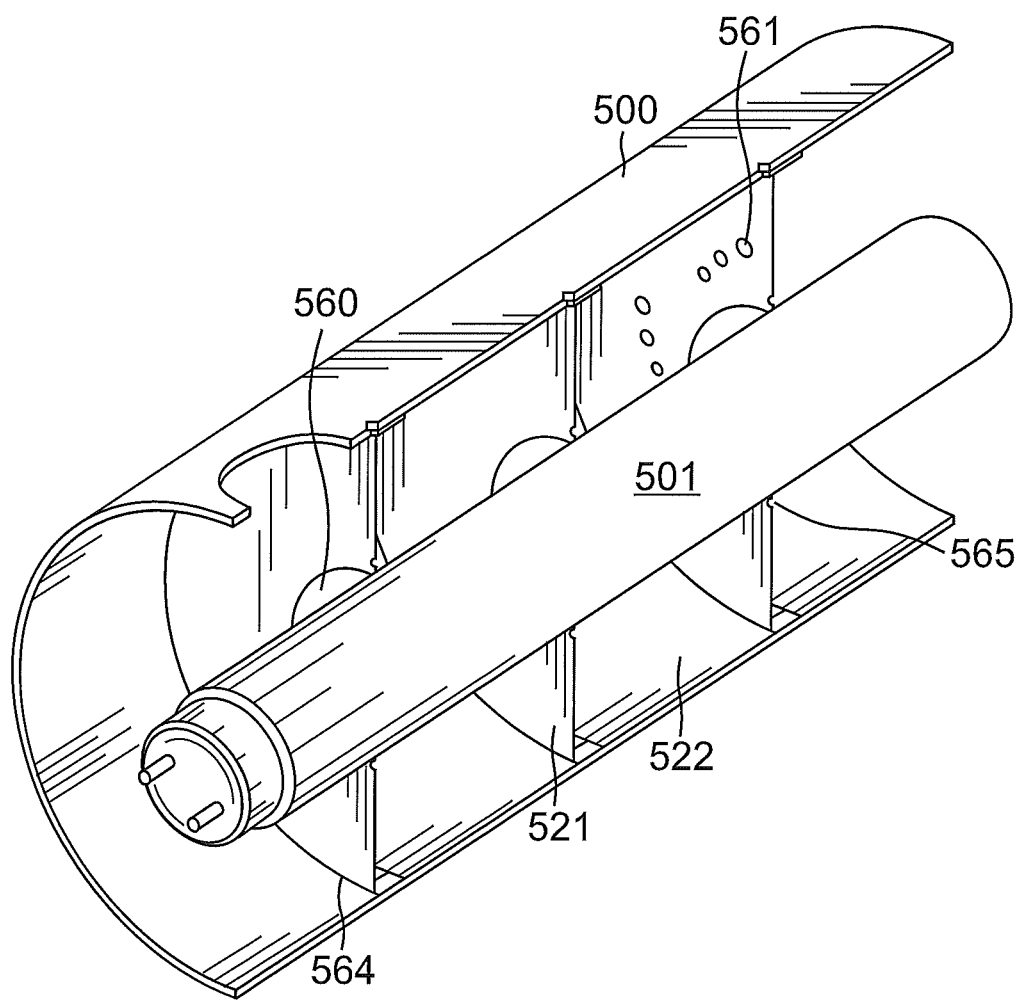
FIG. 5 is a cut-away view of a purification tube in the unit of FIG. 4 and its associated baffles, sub-chambers, and UV-C lamp.

Turning now to FIG. 5, an example tube 500 (such as tube 141 or 151 of unit 140) defines an internal fluid-containing volume (the tube's chamber) that is sub-divided into a plurality of sub-chambers 522 by a corresponding plurality of baffles 521. In this embodiment, baffles 521 are longitudinally arranged with respect the tube and its lamp 501 to define the sub-chambers. As discussed in the '631 application, there are many ways to form the baffles and to arrange them so as to properly define an efficacious sub-chamber structure. In general, any given sub-chamber is defined by one or more corresponding baffles such that the baffles define a cross-sectional flow area to support flow through the sub-chambers. Regardless of how a given baffle structure defines this flow area (the '631 application discloses a relatively large plurality of baffle embodiments), it will be appreciated that a given baffle's cross sectional area should exceed the corresponding flow area it defines so that sub-chambers are thereby defined. In that regard, the terms "chamber" and "sub-chamber" have broad meanings in the arts—as used herein, any structure suitable to define some contained volume defines a chamber or sub-chamber corresponding to this defined volume. Similarly, as used herein, the term "baffle" has a broad meaning in the arts—as used herein, the term "baffle" denotes any structure suitable to impede flow.

Regardless of the shape and arrangement of the baffles, a given baffle will thus be configured to impede or block the fluid flow with regard to a sub-chamber cross-sectional area as defined by the tube and that area occupied by the lamp. This sub-chamber cross-sectional area may thus be considered as divided into a baffle impeded or blocked cross-sectional area and a remaining free flow cross-sectional area that permits fluid flow between adjacent sub-chambers. As used herein, this free flow cross-sectional area will be denoted as the "flow area." In tube 500, each baffle 521 is an annular structure that extends at least partially between an inner circumference 564 for tube 500 and an outer circumference 565 for lamp 501. As discussed in the '631 application, there are numerous ways any given baffle can define the flow area to allow fluid flow through adjacent sub-chambers. For example, in tube 500, each baffle 521 may be spaced apart from outer circumference 565 of lamp 501 to provide an annular opening 560 to define this flow area. Alternatively, or in parallel, each baffle could be spaced apart from inner circumference 564 of tube 500. Although each baffle may be spaced apart from the tube or the lamp in this fashion to provide openings for the flow areas, the baffle itself may could include a variety of slots, openings, or perforations such as conduits 561 to define this flow area. Such openings may be used to entirely define the flow areas such that each baffle effectively seals against the tube and the lamp without any annular spaces as discussed above. Alternatively, these conduits may be used in conjunction with one or more of these annular spaces to define the flow area. In addition, the flow area may be modified through appropriate flanging or spacing of the conduits or passages to enhance fluid mixing within each sub-chamber 522.

But as discussed above, it may be observed that the cross-sectional area of the sub-chambers should exceed the flow area as defined by the baffles so that the sub-chambers are thereby defined. In contrast, should the flow area equal or exceed the "sub-chamber" cross-sectional area, it can be observed that the resulting baffle structure is not effectively defining any sub-chambers. Indeed, it is has been observed through experiments that the cross-sectional area of each baffle/sub-chamber should considerably exceed the corresponding flow area it defines: for example, in one embodiment, the ratio of sub-chamber cross-sectional area to flow area was 11.8. It may be further observed that a wide range of sub-chamber cross-sectional area to flow area ratios produce advantageously efficient embodiments: for example, it is believed that this ratio may range from 1 to 500 to define embodiments that provide advantageous pathogen removal rates as compared to prior art approaches.

As discussed in the '631 application, there is another factor that impacts the pathogen removal efficiency for any given baffled and sub-chambered design—namely, that of the arrangement of the baffles along the longitudinal axis of the tube. In other words, even if the advantageous sub-chamber cross-sectional area to flow area range of 1 to 500 is implemented as discussed above, additional substantial pathogen removal rate efficiency is produced by optimizing the baffle spacing accordingly (and hence the total number of sub-chambers defined by any given tube). In that regard, the '631 application observed that this spacing will depend upon flow rate and sub-chamber cross-sectional area as well as the UV-C lamp power and the desired pathogen removal rate efficiency. For typical portable UV-C purification embodiments, it has been observed through experiments that a ratio of the sub-chamber volume to flow area can be used to define this optimal baffle spacing. For example, efficient performance has been observed at resulting ratios of 0.81 meter (m) and 1.10 m. But it will be observed that such a ratio is not dimensionless and thus will need to be adjusted if the flow rate and tube size are substantially altered from those dimensions disclosed in the '631 application. Additional embodiments for suitable baffle and sub-chamber arrangements are discussed in the '631 application, the contents of which are incorporated by reference in their entirety.

Figure 6:
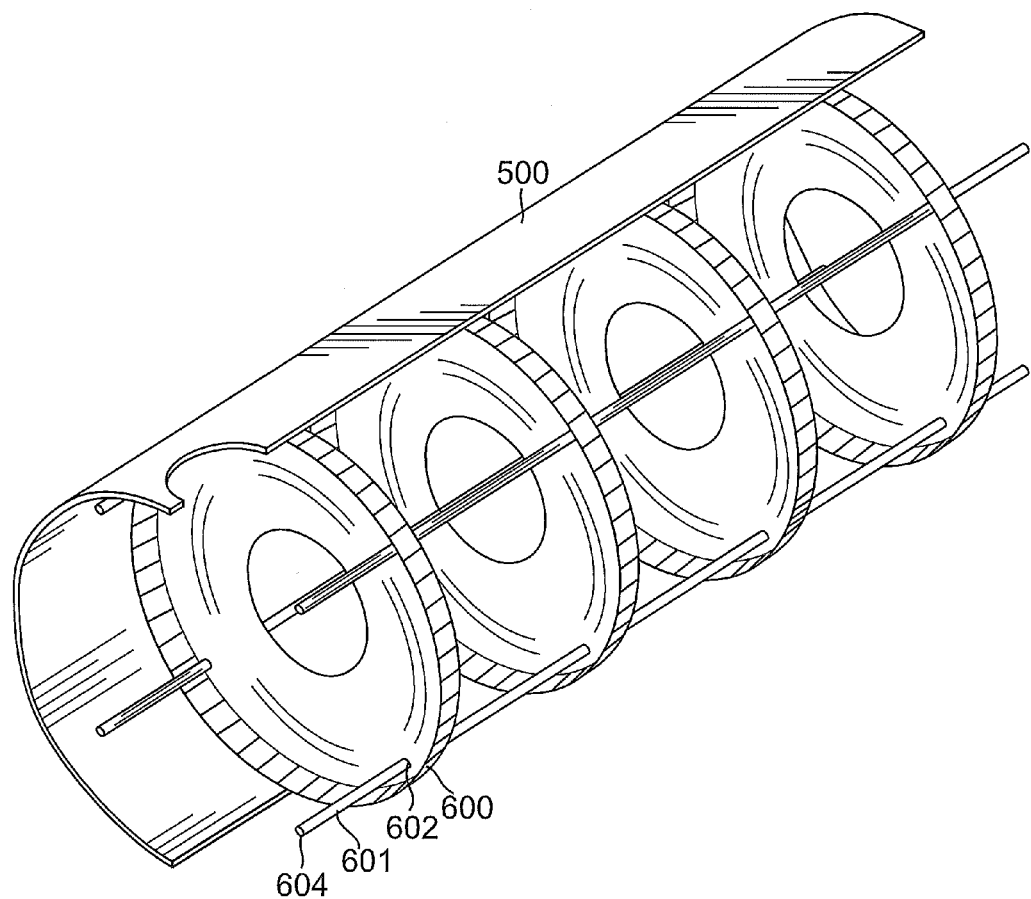
FIG. 6 is a cut-away view of a purification tube modified for carrier rods.
Figure 7:
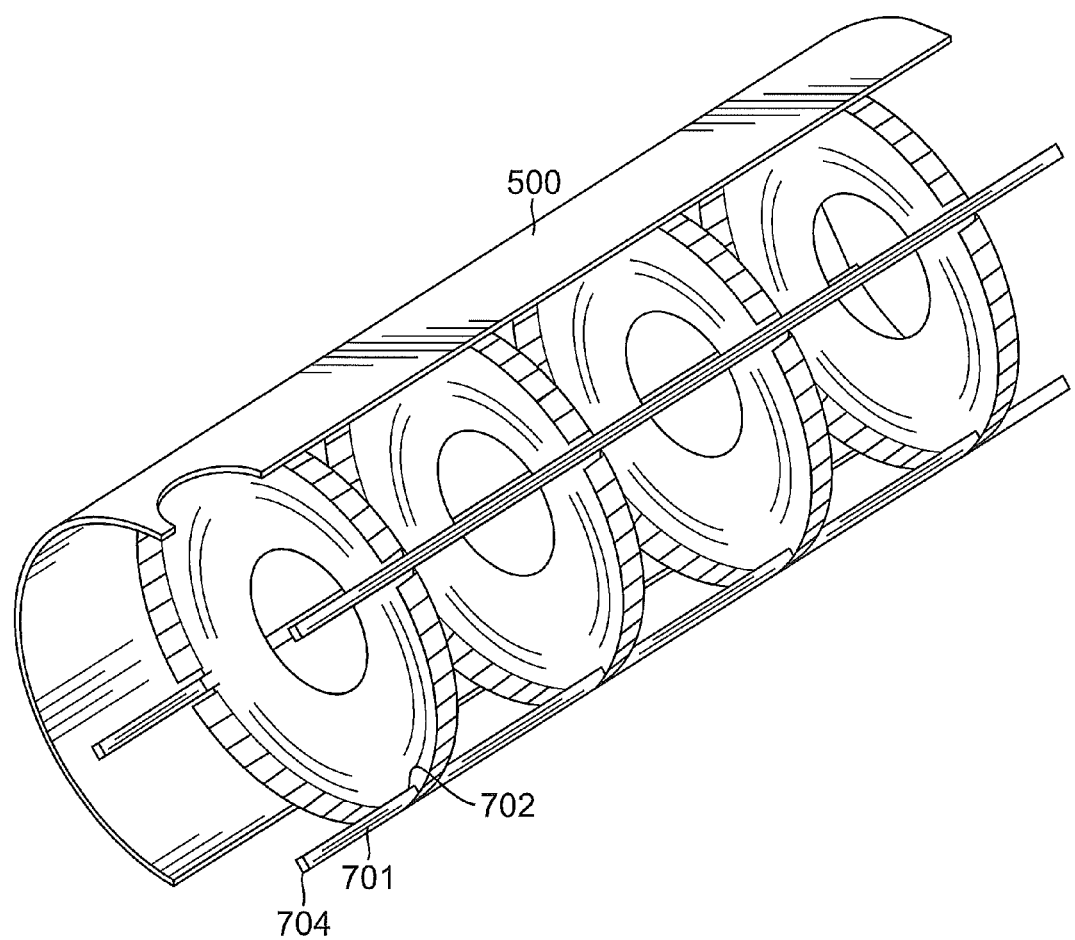
FIG. 7 is a cut-away view of a purification tube modified for resistance-weldable carrier rods.

Various methods of UV-C purification unit manufacture are discussed in the '631 application. Turning now to FIG. 6, such manufacturing techniques are enhanced by first attaching baffles 600 to carrier rods 601 before insertion into tube 500. A plurality of carrier rods 601 are inserted through appropriate perforations in the baffles and fastened through, for example, welds at rod/baffle junctions 602. The resulting rod/waffle assemblage may then be inserted into chamber tubing 500, whereupon the assemblage may be anchored to chamber 500 in a number of fashions—for example, by using welds at carrier rod ends 604. As discussed in the '631 application with respect to the tubing and the baffles, the rods may comprise stainless steel or anodized aluminum because of the excellent UVC reflectivity and UVC durability of these materials. Alternately, the rods can be fabricated from corrosion resistant or plated steel, or UVC resistant polymers such as polyimide, polytetraflouroethylene (PTFE), fluorinated ethylene propylene (FEP), polyvinylidene fluoride (PVDF), polyetheretherketone (PEEK), or polyetherimide (PEI). Carrier rods 601 have a circular cross-section but as illustrated in FIG. 7, carrier rods 701 with a square cross-section may also be used, in addition to other cross-sectional variations. As seen in FIG. 7, carrier rods 701 may be readily fastened such as through resistance welding to tabs 702 on the outer circumference of the baffles. The resulting rods/baffles assemblage is then inserted into tube 500 and secured through, for example, welds at ends 704 of the carrier rods.

Figure 8:
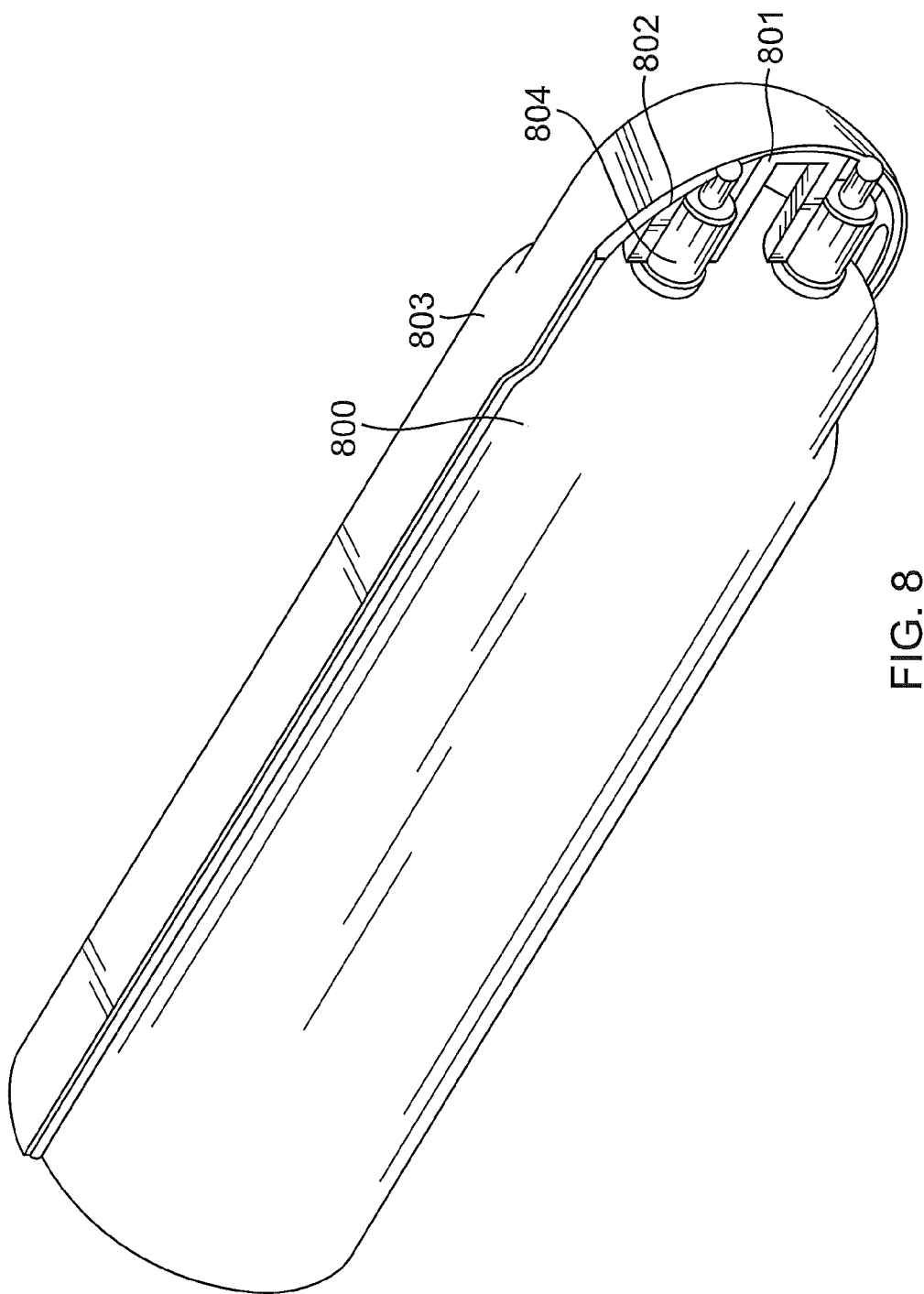
FIG. 8 is a distal cut-away view of a single-ended lamp with filaments at both ends.

As discussed in the '631 application, the UV-C lamp may be covered with a sheath to protect it from direct water contact. Such a sheath may cover either a double-ended or single-ended lamp. A single-ended application has the advantage of easier coupling to the remainder of the system but double-ended lamps may be more available or cheaper. To enable a double-ended lamp to be used in a single-ended fashion, the electric contacts/terminals at the distal end of the lamp will need electrical coupling before being encased. As seen in FIG. 8, the distal end of the lamp is covered by an end cap 801. Lamp 800 and cap 801 are enclosed within a sheath 803. Sheath 803 may be constructed of heat-shrinkable fluorinated ethylene propylene (FEP). Atlernately, other UVC resistant polymers such as polyvinylidene fluoride (PVDF), polyetheretherketone (PEEK), or polyetherimide (PEI) may be used. The lamp filaments at this distal lamp end are powered by wires 802 which run the length of the lamp to contacts 804. The wires 802 are insulated by PTFE or FEP or PFA or other flouropolymer electrical insulation which is UV-C damage resistant. The end cap 801 provides a hemispherical shape with a diameter less than or equal to the lamp to allow for insertion of the lamp into chamber 500 while still allowing a PTFE o-ring to seal on the outside diameter of sheath 803. Hemispherical end cap 801 supports sheath 803 to prevent wrinkling or collapse during the thermal recovery process. It is preferably fabricated of a material with a melting or softening point above the heat recovery temperature of the FEP sheath. For example, end cap 801 may comprise stainless steel or some other suitable metal. Sheath 803 may be processed to create a closed end prior to sliding it over the lamp for thermal recovery. In order to avoid trapping air between the lamp and the closed distal end of sheath 803, wires 802 are configured to provide a space adjacent to lamp 800 to provide a small cross-sectional area for the higher temperature air to escape as sheath 803 shrinks to prevent bubbles from forming or bursting of the sheath at the distal end. Wires 802 may be wrapped in a helical fashion around lamp 800 to better support them during the FEP thermal recovery process. In this embodiment, or with a double ended lamp as described in the '631 application, a UV-C photodetector (not illustrated) may be placed in the lamp cap outside of the water contact to verify the power output of the lamps. By placing the photodetector outside of the water-filled sub-chambers, it is not subject to fouling.

Figure 9:
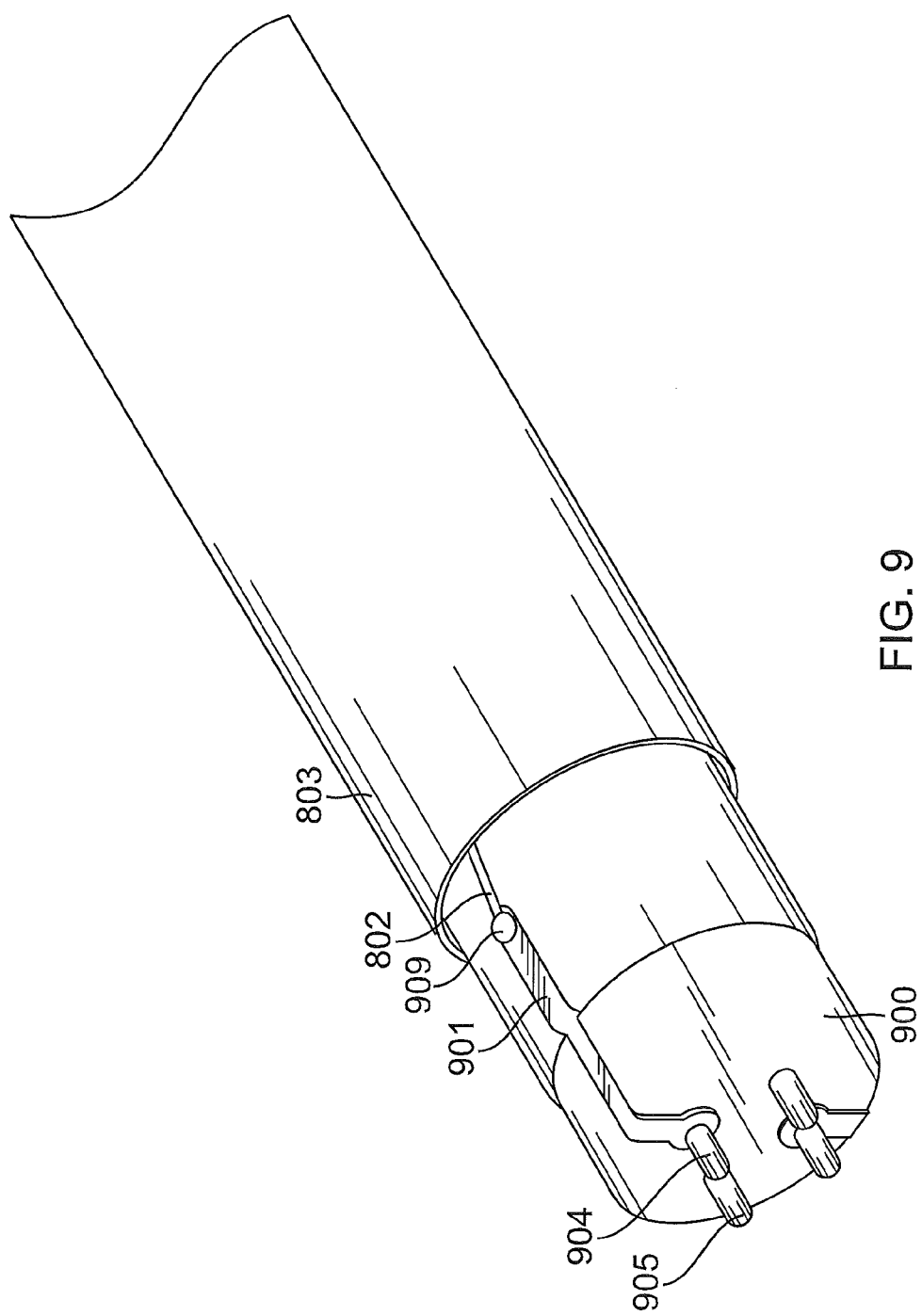
FIG. 9 is a proximal cut-away view of the lamp of FIG. 8.

FIG. 9 shows the proximal end of lamp 800 and sheath 803, which is illustrated partially cut away to expose foil contacts 901. These foil contacts reduce the maximum diameter of the wires 802 to enable a PTFE o-ring to seal against the sheathed lamp 800 without leaking. These foil contacts are soldered or otherwise electrically connected to wires 802 at junctions 909. The foil contacts travel across an insulating end cap 900 that serves as a mount for contacts 904 which electrically connect to foil strips 901. Contacts 904 thus provide the power to the distal end whereas contacts 905 provide power to the proximal end of lamp 800.

Figure 10:
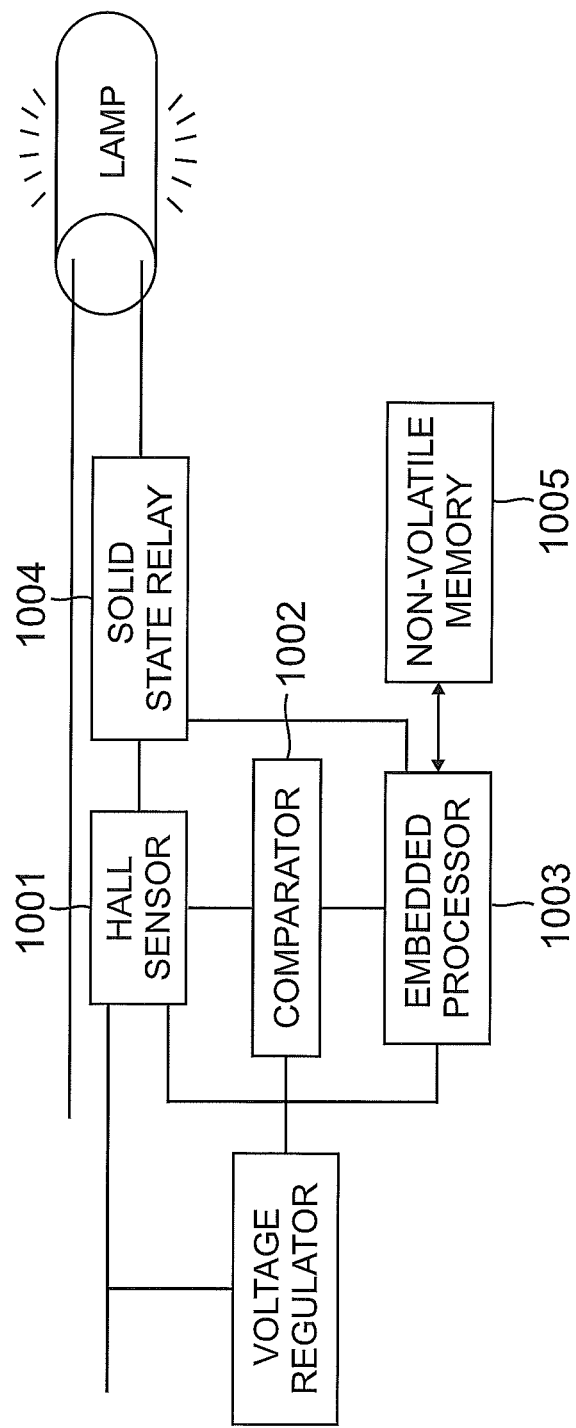
FIG. 10 is a block diagram for a lamp control system.

The end cap 900 of the lamp may also house electronics for tracking the number of lamp hours and/or the number of lamp starts so as to disable lamp operation accordingly. Turning now to FIG. 10, lamp operation may be sensed by comparing the current sensed by a hall sensor 1001 through a comparator 1002. An embedded processor 1003 coupled to the comparator may then monitor lamp operation and store the number of lamp starts and hours used in a non-volatile memory 1005. In one embodiment, processor 1003 may disable further lamp operation once a predetermined number of lamp starts or hours of use are reached by inactivating a solid state relay 1004.

Although a UV-C purification unit that is baffled in this fashion to define sub-chambers as disclosed in the '631 application and described herein provides radically improved pathogen removal efficiency over the prior art approaches, the present disclosure discloses a current reduction technique that offers weight reduction and efficiency improvements regardless of whether the UV-C purification unit is baffled or not. This peak current reduction feature will now be discussed.

Pump Motor Peak Current Draw Reduction

Figure 11:
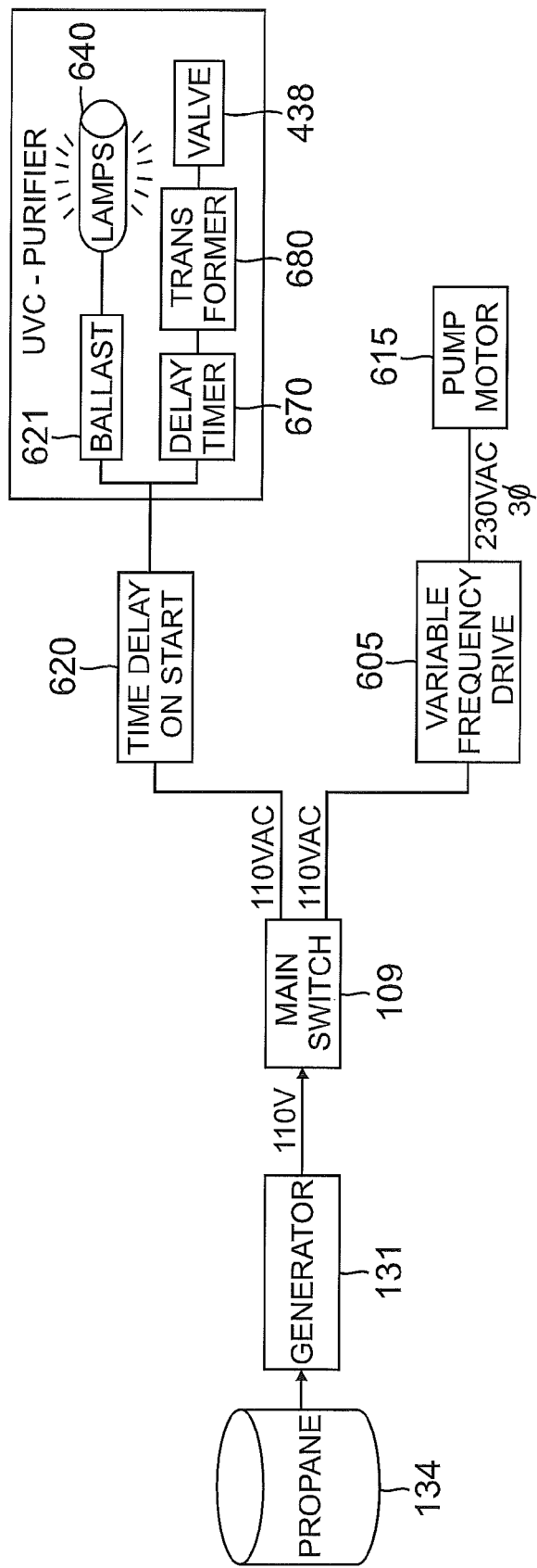
FIG. 11 is a first block diagram for the power flow and associated control for the system of FIG. 1.

The advantageous peak current reduction feature disclosed herein may be better understood with respect to a power distribution and control block diagram for UV-C purification system 100 as illustrated in FIG. 11. Generator 131 burns propane fuel from tank or cylinder 134 to provide an AC voltage such as 110V to a main switch 109. As discussed previously, after the pump has been properly coupled and placed into a suitable water source with the generator functioning, a user may activate switch 109 to commence normal operation of system 100 such that electrical power may be provided to a pump motor 615. However, an electrical motor such as pump motor 615 will demand a relatively large peak current at such a startup initiation. To reduce this initial peak electric current draw by pump motor 615, a current reduction module such as a variable frequency drive (VFD) module 605 controls the current provided to motor 615 as discussed further herein.

Because of the conventional use of 60 Hz alternating current (AC) current to drive electronically-powered equipment, an AC-motor-driven pump is typically cheaper and more available than DC-motor-driven pumps. Thus, the following discussion will assume that pump motor 615 is an AC motor such that generator 131 is an alternator generating AC voltage and current. VFD module 605 drives pump motor 615 with an AC current that increases in frequency from an initial low frequency such as zero Hz to the operating frequency of 60 Hz. Other frequencies may be used. VFD module 605 is programmed to cause pump motor 615 to reach at least 30 rpm after 1 second of operation to cause the pump bearings to be lubricated by enough water flow. In addition, VFD module 605 is programmed to allow enough time for pump motor 615 to reach full operating speed without exceeding the limited power generation capacity of the generator 131. Alternative current reductions techniques may be used. For example, VFD module 605 may be supplemented by or replaced with one or more capacitors. Similarly, should generator 131 be producing a DC output current, VFD module 605 acts as a variable frequency inverter. However, because of the conventional use of 60 Hz AC current, AC generators are typically cheaper and more readily available.

Regardless of the DC or AC character of the power supplied by generator 131, if pump motor 615 is a DC brush-type or brushless motor, VFD module 605 may be replaced by a DC motor controller such as a digital servo controller utilizing an H-bridge amplifier to implement a pulse width modulation technique to achieve a similar result in reduction of peak starting current.

VFD module 605 may be implemented using a dedicated logic engine or a suitably configured processor such as a Teco Westinghouse JNEV-1P5-H1 microprocessor controlled inverter motor speed regulator. The advantages of implementing such peak current reduction at pump motor startup were demonstrated using the Teco Westinghouse processor as the VFD module and a Franklin Electric 230V AC 3 phase ½ horsepower (375 watt) submersible pump motor. The specifications on peak starting current are 18 amps for a standard configuration in which the motor is started by a magnetic starter without any current reduction features. The continuous current requirement for subsequent normal operation of this Franklin motor is relatively much lower at 3.1 amps.

With the Teco Westinghouse variable frequency drive configured as discussed above (reaching 30 current cycles per second one second after startup), the peak starting current was measured for twenty motor starts with the motor achieving a final frequency of 60 Hz in 1.8 seconds. In contrast to the 18 amp peak starting current without the VFD, the VFD-driven pump motor required only 9.86 amps peak starting current, a significant reduction which reduces the size and weight of generator 131 required to power system 100. To further reduce the output power necessary for generator 131, a delay circuit 620 responds to the actuation of main switch 109 by initiating a relatively short delay period of sufficient length to allow motor 615 to reach operating speed. In the example embodiment discussed above, a suitable delay period would be 1.8 seconds but it will be appreciated that the exact length of this delay period depends upon the particular operating characteristics of whatever motor is being used to drive the pump. After the expiration of this delay period, delay circuit 620 drives a switch (not illustrated) to couple one or more UV-C source lamps 640 within the UV-C purification unit to the generator-provided current through a ballast 621.

It will be appreciated that operation of system 100 may be further enhanced using additional control techniques. For example, after a VFD ramp up period (which is relatively short such as the 1.8 second period discussed above), pump 615 will be forcing water through UV-C purification unit 140 at whatever steady-state flow rate system 100 has been engineered for: in general, it is desirable to have system 100 produce 1,500 to 6,000 liters per hour of purified water so as to maximize the number of people whose drinking water needs may be served by system 100. However, such a flow rate may thus initially expel insufficiently-treated water from UV-C purification unit 140 after motor 615 and lamp 640 startup.

To prevent this initial insufficient treatment, the electronics container 455 discussed with regard to FIG. 4 may include another delay circuit 670 that drives a shutoff valve 438 for UV-C purification unit 140 through a transformer 680 as illustrated in FIG. 11. As discussed above, shutoff valve 438 supplies outlet terminal 138 for UV-C purification unit 140 such that if valve 438 is shut, no water can flow from unit 140 through outlet 138. Delay switch 670 is configured to initiate a delay period upon actuation of switch 109 (or lamp 640) and then open valve 438 after the expiration of this delay period. The delay period is selected so that the residual water within unit 140 is purified before valve 438 opens to deliver the resulting purified water to the consumers. As an alternative to this control of valve 438, a clutch (not illustrated) could be provided to couple motor 615 to the remainder of pump 115. This clutch would be responsive to delay switch 670 in that it would not engage the motor until after the delay period had ended. In this fashion, valve 438 could be eliminated. Alternatively, such a clutch could be used in conjunction with valve 438 to provide additional fail-safe features. Moreover, the VFD module 605 may control the pump motor frequency with a closed loop method such as PID based on input from a pressure sensor or sensors on the UV-C purification unit to maintain constant flow rate through the system independent of pump depth or pressure head. Alternately, the VFD module may be used to drive valve 438 or in lieu of this valve in a similar fashion through monitoring of flow rates in unit 140 through one or more pressure sensors as analogously discussed in the '631 application. In that regard, if system 100 senses through these pressure sensors (not illustrated) that a an unacceptable (too fast or too slow) flow rate is occurring though unit 140, VFD module 605 may slow or stop action of pump motor 615 accordingly. The '631 application also discloses the monitoring of the lamp performance through current sensing or photodiode detection. Thus, VFD module 605 may limit or stop motor 615 should system 100 detect that the UV-C lamps are not performing as desired.

Figure 12:
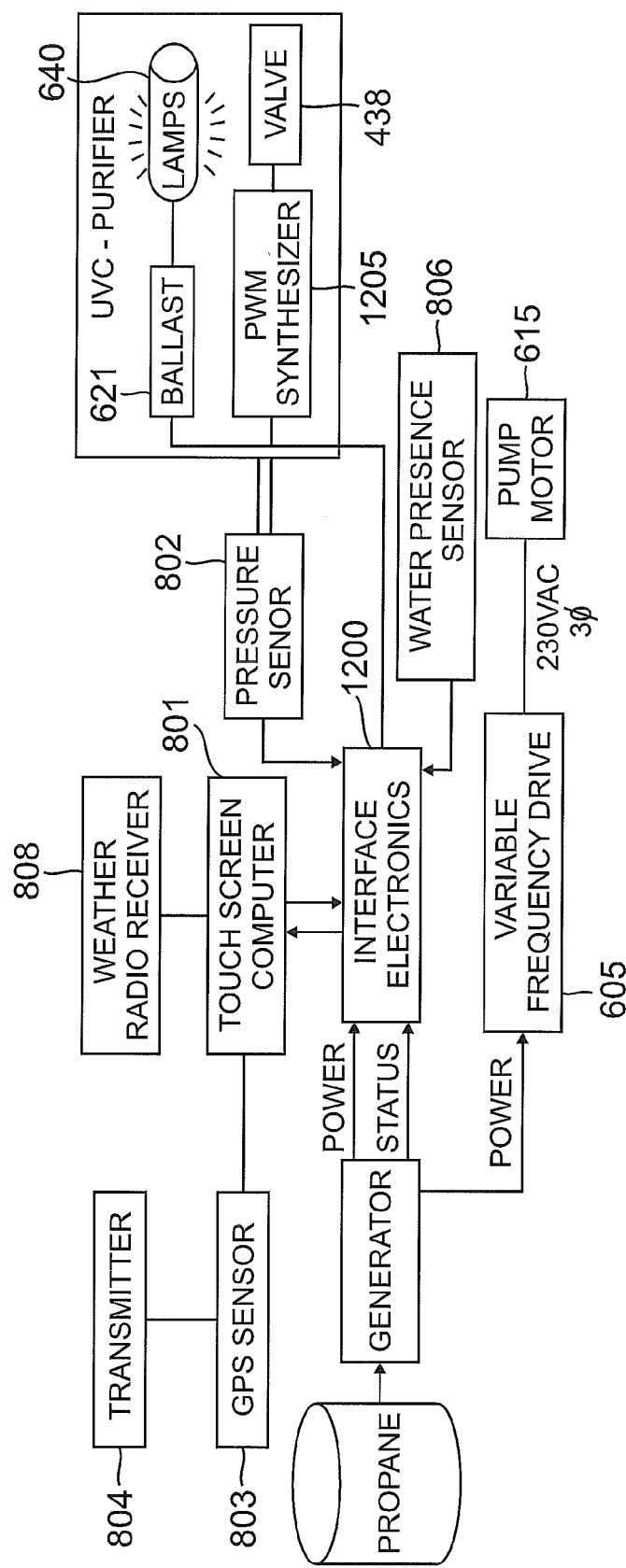
FIG. 12 is a second block diagram for the power flow and associated control for the system of FIG. 1.

The power flow and associated control discussed with regard to FIG. 11 may be readily modified. For example, an alternative power flow architecture is shown in FIG. 12. A touchscreen computer 801 allows more control over the functions of the system by allowing the option to override pre-programmed system configurations or operational parameters such as changing timing or flow rates. In addition, computer 801 allows the display of more feedback information to the operator such as the amount of fuel remaining in the tank, number of gallons pumped through the system, etc. Remote operation or intervention may be performed on the unit through remote radio control using a wireless transceiver 804. In addition, computer 801 may interface with a weather radio receiver 808 to display weather reports and related information on the touchscreen display.

An electronic pressure sensor 802 at the water inlet to UV-C purification unit 140 coupled through interface electronics 1200 enables a resulting control of the frequency of the AC power to the pump motor 615 through variable frequency drive 605. Variable frequency drive 605 uses a proportional integral derivative (PID) or fuzzy logic control algorithm or other feedback control algorithm to control the motor frequency to keep the pressure constant at sensor 802. Such constant pressure may be used to ensure constant flow rate of fluid through the system independent of the water level relative to the unit or the pump height relative to unit or pump inlet head pressure.

Touchscreen computer 801 may be interfaced to a global positioning satellite receiver 803 which provides system location information which can be transmitted along with system information such as fuel level remaining, number of gallons pumped, and error fault or caution conditions through transceiver 804. The transmitted information can be received by a central control console by radio waves or through a cellular communications system. A system operator may thus remotely observe the system status for all systems on within radio transmission range. Alternately, a wireless mesh network may be configured for the systems to allow for redundancy in communication between systems.

Remote monitoring or control of system 100 may thus be performed remotely by radio transmission to a central console or computer network interface, allowing access to the information over a computer network. Remote control of one or more systems may be accomplished by incorporating transceiver 804, allowing control through radio transmission from a variety of remote transmitters such as a central control console or transmitter connected to a computer network. In addition, submersible electric pump motor 615 may be protected by a water presence sensor 806. The sensor 806 is preferably an ultrasonic water presence sensor as shown also in FIG. 14. Valve 438 may be controlled by a pulse width modulator 1205 which synthesizes a waveform to eliminate the need for the transformer in FIG. 11, thus saving weight.

Figure 13:
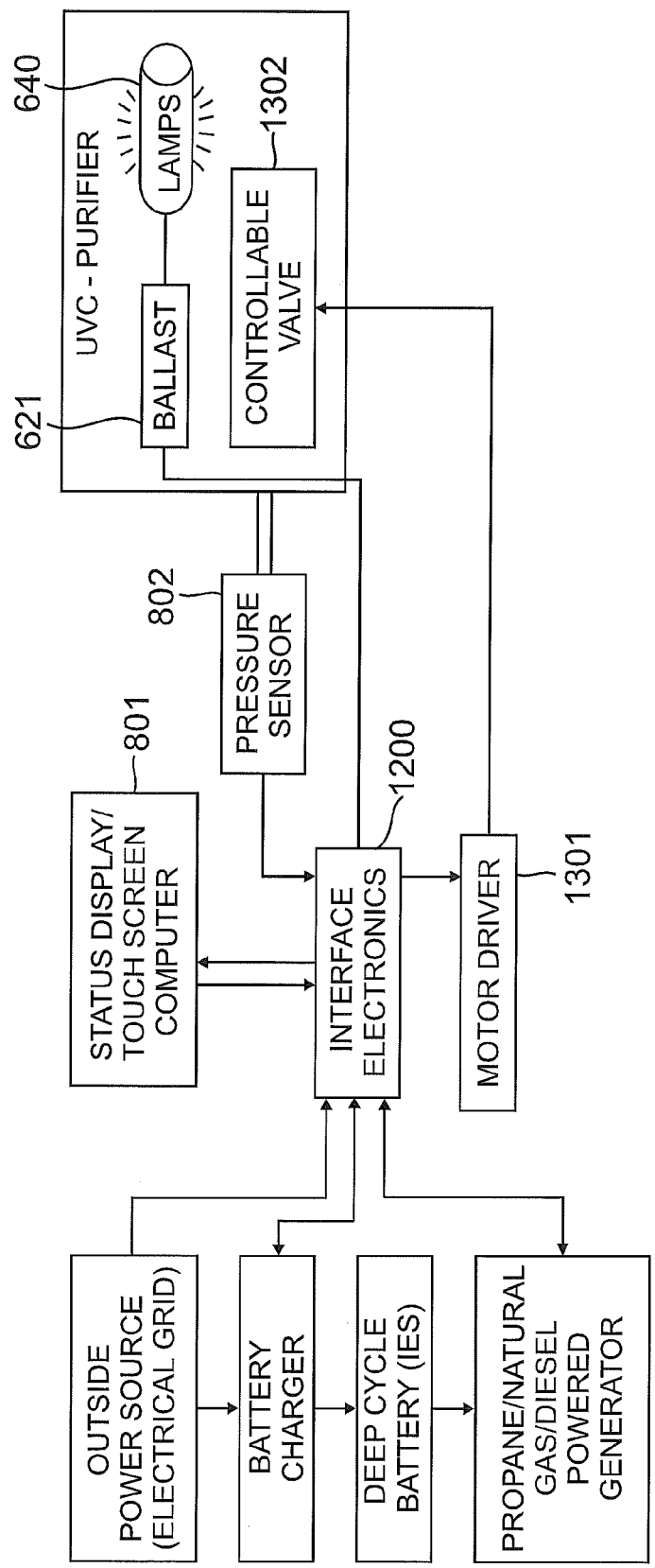
FIG. 13 is a block diagram for the power flow and associated control for the system of FIG. 1 modified for use with pressurized water sources and optionally-intermittent power sources.

Yet another alternative power flow and associated control architecture is shown in FIG. 13. In this embodiment, the system is used with an existing pressurized water source such that pump 115 of FIG. 1 is unnecessary. To control the flow of fluid through the system, a controllable flow valve or constant flow valve 1302 either replaces or is placed in series with the solenoid controlled output valve 438 of FIGS. 11 and 12. Should controllable valve 1302 replace valve 438 as a constant flow valve, valve 1302 may be capable of being turned completely off to irradiate the residual volume of the chamber prior to starting the flow. The controllable flow or constant flow valve 1302 may be of a mechanical type, or preferably actuated by a motor which is driven by the motor driver 1301. The motor would be controlled through a feedback control system as shown in FIG. 13 with the pressure sensor 802 supplying the feedback signal to control the flow through the system by actuating valve 1302 according to a PID or fuzzy logic or other feedback control algorithm. In the embodiment of FIG. 13, power may be supplied though an existing utility electrical grid. Should this grid supply intermittent power as is often the case in developing countries, a deep-cycle battery (or batteries) supplies power during grid power-off times. When power is available from the grid, the battery may be re-charged through a battery charger. The battery may also be re-charged through a propane-powered generator as discussed with regard to FIG. 1.

It may thus be observed that a rather remarkable advance over the prior art is disclosed in the present application. In one embodiment, the already efficacious performance of the baffled UV-C purification unit disclosed in the '631 application is combined within a portable housing that includes a removable pump and a generator/fuel source such that users are enabled to quickly and cheaply deploy to remote or urban locations that have problematic water sources. Despite the low weight and cost for such a system, it offers dramatic pathogen removal rates such as those demanded by the EPA for public water supplies. Even in embodiments that do not enjoy the advantages discussed herein for an appropriately baffled and sub-chambered UV-C purification unit, the resulting systems are light weight and also fuel efficient due to the lower power generators that may be successfully accommodated by the systems disclosed herein.

Embodiments described above illustrate but do not limit the invention. It should also be understood that numerous modifications and variations are possible in accordance with the principles of the present invention. Accordingly, the scope of the invention is defined only by the following claims.

I claim:

1. A portable UV-C water purification system, comprising:
an electric-motor-driven pump for pumping water to be treated into the system;
a generator for generating electricity for the motor;
a peak current reduction module for reducing a peak startup current for the motor, whereby a maximum power capacity for the generator is reduced accordingly, wherein the generator is an AC generator and wherein the peak current reduction module is a variable frequency drive module; and
a UV-C purification unit having an inlet for receiving the water to be treated, wherein the pump is configured to pump the water to be treated into the inlet.

2. The system of claim 1, further comprising:
a housing for containing UV-C purification unit, the pump, the generator, and the peak current reduction module.

3. The system of claim 1, wherein the generator includes an internal combustion engine for generating power to be converted by the generator into the generated electricity.

4. The system of claim 2, further comprising:
a fuel source contained by the housing, wherein the generator includes an internal combustion engine for generating power using fuel from the fuel source.

5. The system of claim 4, wherein the fuel source is a propane cylinder.

6. The system of claim 5, wherein the engine includes a hand-pulled starter.

7. A method of treating water, providing:
powering an electric-motor-driven pump from an initial off state into an operating state using a peak current reduction technique;
driving a UV-C lamp within a UV-C purification unit to produce UV-C irradiation;
pumping water using the powered electric-motor-driven pump from an untreated water source into the driven UV-C purification unit so as to reduce pathogens in resulting treated water, wherein the electric-motor-driven pump is an AC-motor-driven pump, and wherein using the peak current reduction technique comprises applying a variable frequency drive to an AC current used to power the pump from the initial off state to the operating state.

8. The method of claim 7, further comprising:
generating electric power using a generator to power the pump and to drive the UV-C lamp, whereby a maximum power capacity for the generator is reduced by the peak current reduction technique.

9. The method of claim 7, wherein applying the variable frequency drive comprises varying the AC current from 0 Hz to 60 Hz over an initial ramp-up period.

10. The method of claim 8, wherein generating the electric power comprises driving the generator using an internal combustion engine fueled by a fuel source.

11. The method of claim 10, wherein the fuel source is propane.

* * * * *